United States Patent
Tomlinson et al.

(10) Patent No.: US 10,107,398 B2
(45) Date of Patent: Oct. 23, 2018

(54) EXTRUDED GASKET SIDE BY SIDE END CUT SYSTEM

(71) Applicant: Ford Global Technologies, LLC, Dearborn, MI (US)

(72) Inventors: Samuel Jeffrey Tomlinson, Farmington Hills, MI (US); Thomas Edward Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/267,394

(22) Filed: Sep. 16, 2016

(65) Prior Publication Data
US 2018/0080557 A1    Mar. 22, 2018

(51) Int. Cl.
*F16J 15/02* (2006.01)
*F02F 11/00* (2006.01)

(52) U.S. Cl.
CPC ........... *F16J 15/024* (2013.01); *F02F 11/002* (2013.01)

(58) Field of Classification Search
CPC .......... F16J 15/02; F16J 15/021; F16J 15/022; F16J 15/024; F02F 11/002
See application file for complete search history.

(56) References Cited

U.S. PATENT DOCUMENTS

| | | | |
|---|---|---|---|
| 3,595,588 A * | 7/1971 | Rode | F16J 15/0887 277/647 |
| 4,242,387 A | 12/1980 | Ward | |
| 4,784,397 A * | 11/1988 | Tozer | F16J 15/0887 277/644 |
| 4,798,392 A * | 1/1989 | Tozer | F16J 15/0887 277/644 |
| 4,858,286 A | 8/1989 | Siegel | |
| 5,149,108 A | 9/1992 | Leiszter | |
| 6,126,173 A | 10/2000 | Westhoff et al. | |
| 6,237,921 B1 * | 5/2001 | Liotta | F01D 11/005 277/630 |
| 6,352,267 B1 * | 3/2002 | Rode | F16J 15/0887 277/631 |
| 6,644,008 B2 | 11/2003 | Rosenwasser et al. | |
| 9,291,266 B2 | 3/2016 | Yu | |
| 2011/0031704 A1 | 2/2011 | Lehr | |

FOREIGN PATENT DOCUMENTS

JP    2008137534    6/2008

* cited by examiner

*Primary Examiner* — Gilbert Y Lee
(74) *Attorney, Agent, or Firm* — LeClairRyan

(57) ABSTRACT

An extruded interlocking flexible gasket with a first side with at a least one first side spline and at least one first side groove on the gasket to be positioned between a first member and a second member. The gasket further having a second side with at a least one second side spline and at least second first side groove on said extruded gasket, wherein said first side interlocks with said second side when said first side is immediately adjacent to said second permitting the at a least one first side spline to be interlocked with at least the second side groove, and extending continuously therealong.

18 Claims, 3 Drawing Sheets

EXTRUDED GASKET SIDE BY SIDE END CUT SYSTEM

BACKGROUND OF THE INVENTION

Resilient, compressible gaskets are typically utilized in engines, for example a valve cover gasket provides an impervious seal between a cylinder head and an engine valve cover. Gaskets can be Multiple Layers Steel (MLS), solid copper or a composite material. MLS gaskets typically consist of three layers of steel and the contact faces are usually coated with a rubber-like coating such as Viton that adheres to the cylinder head and the engine valve cover. The solid copper gasket is typically machined using an 'o-ringing' process that places a piece of wire around the circumference of the cylinder to bite into the copper. Composite gaskets can be made by injection molding and can typically be made from asbestos or graphite but are more prone to blowouts. Additionally, asbestos gaskets are becoming increasingly rare due to health concerns over the carcinogenic effects of asbestos. Newer gaskets can be made from room temperature vulcanization (RTV) silicon and/or rubber coated metal (RCM).

An internal combustion engine is typically a water-cooled four-stroke gasoline design and can use three circuits of working fluids, for example, a combustible air/fuel mixture circuit, a water based glycol mixture coolant circuit, and a motor oil circuit for lubrication. The head gasket seals the joint between the valve (rocker) cover and the cylinder head of the engine. A failure of this gasket can cause oil to leak from the engine which can lead to a catastrophic engine failure.

An extruded gasket can be utilized as a valve cover gasket, but current techniques of utilizing an extruded gasket requires a manual process of adjoining the two ends, usually with a vulcanizing, heating or gluing process that can pose a risk to have offset ends, thus creating a potential leak path. Additionally, the process of joining the two ends of an extruded gasket requires an exact measurement along with a meticulously performed cut to obtain the exact length necessary to properly fit into the sealing system groove.

DETAILED DESCRIPTION

Figure 1:
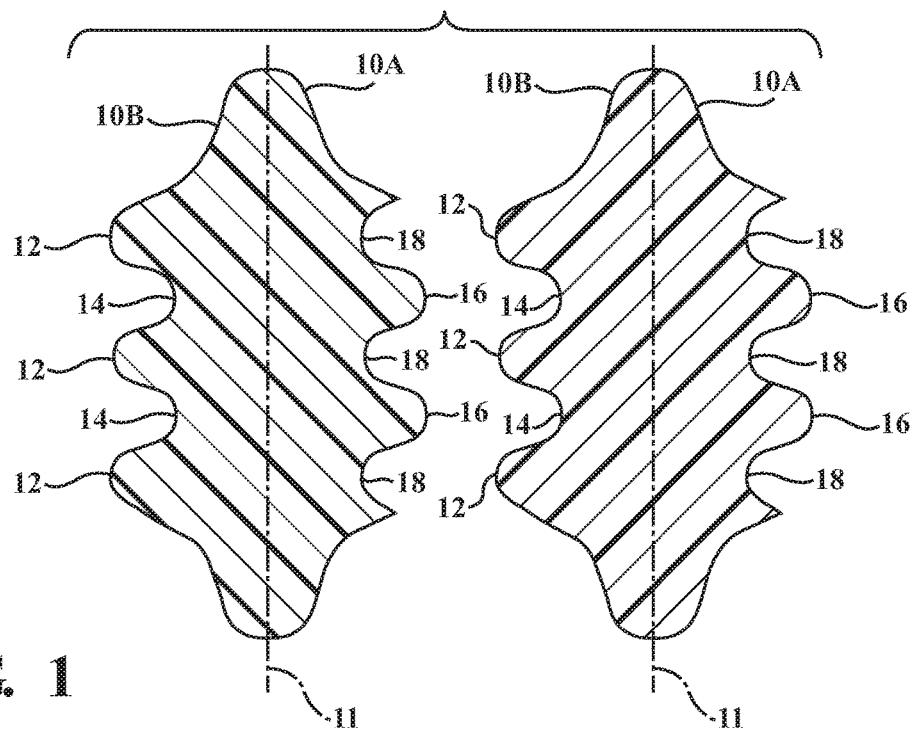
FIG. 1 is a cross section view of an extruded interlocking flexible gasket adjacent to itself when the gasket overlaps itself.

With reference to the Figures, wherein like numerals indicate like parts throughout the several views, FIG. 1 illustrates an extruded gasket 10 adjacent to itself. For illustrative purposes, the gasket 10 is shown split in two sections by a centerline plane 11. A first side 10A of the gasket 10 is shown adjacent to a second side 10B of the gasket 10. The first side 10A of the gasket 10 has a spline 16 and a groove 18. The second side 10B of the gasket 10 can also have a spline 12 and a groove 14. The number of groove 14 18 will usually be one less than the number of spline 12 16, and the number of grooves and splines can vary with the size of the gasket needed to affect a proper seal.

The gasket 10 is produced via an extrusion process to ensure uniform conformity of its shape, and thereby have the ability to be interlocked with itself to produce a seal. The gasket 10 can be any resilient compressible material, for example, an inorganic polymer, an organic polymer, a copolymer, a fluoropolymer, a polyester, a rubber, a silicone rubber, a synthetic rubber, a vinyl polymer, or a terpolymer of ethylene, methylacrylate and a cure site monomer, also known as Vamac®.

Figure 2:
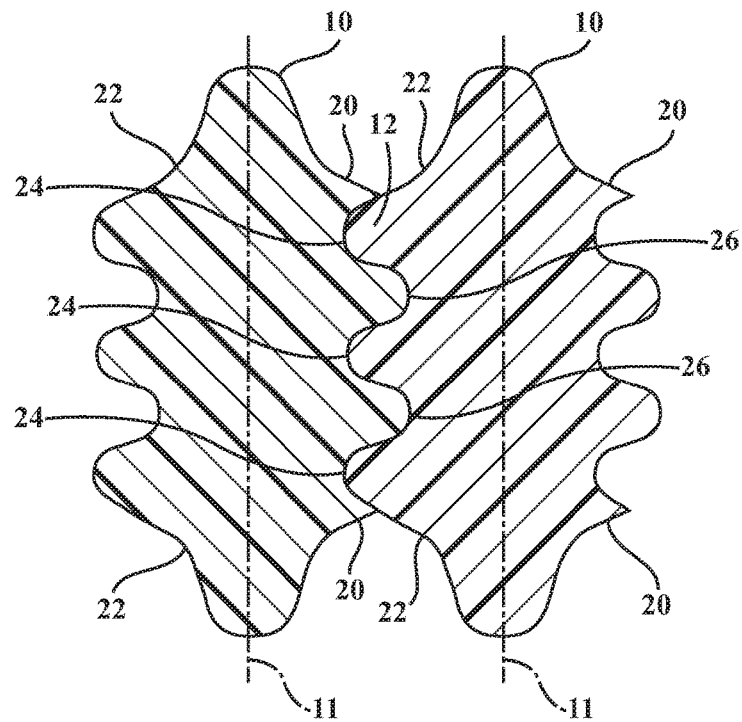
FIG. 2 is a cross section view of an extruded interlocking flexible gasket interlocked to itself.

Now with reference to FIG. 2, the gasket 10 is physically positioned next to itself such that the gasket 10 first side 10A is interlocked with the second side 10B. A shoulder 20 of the first side is on top of an arcuate shoulder edge 22 of the spline 12. A first spline edge 24 of the spline 12 is immediately adjacent to the groove 18 and a second spline edge 26 of the spline 16 is immediately adjacent to the groove 14 to form the interlock.

Figure 3:
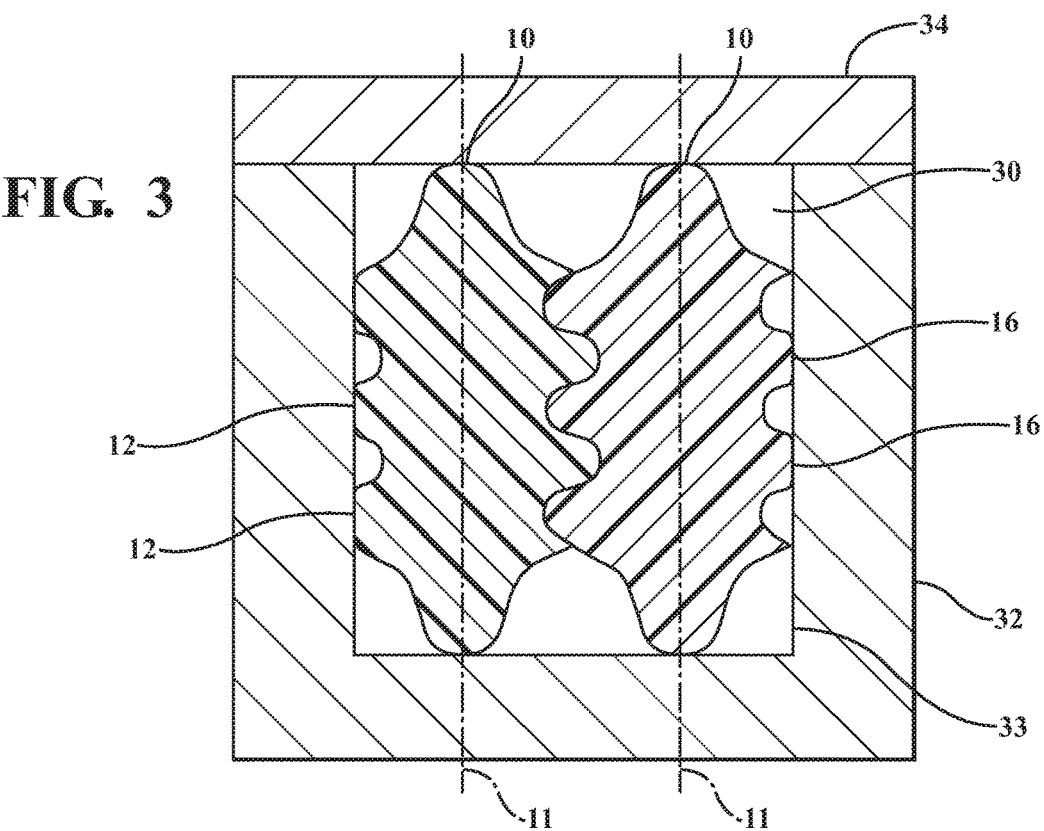
FIG. 3 is cross section view of an extruded interlocking flexible gasket adjacent to itself interposed in a housing and adjacent to a cover.

Now with reference to FIG. 3, the gasket 10 is placed in a channel 30 about a perimeter of a first member 32. The channel 30 will have an inner surface 33 which engages portions of the gasket 10, the gasket 10 can then seal the first member 32 to a second member 34, which are immediately adjacent to each other. Furthermore, in this example, as the second member 34 is affixed to the first member 32, the second member 34 will put a downward pressure onto the gasket 10, causing the gasket to expand in the lateral direction. The expansion will cause the splines and the grooves to further interlock with each other. Additionally, the spline 12 16 of gasket 10 non adjacent sides can deform and press up against the inner wall 33 of the channel 30, further forming the seal.

Figure 4:
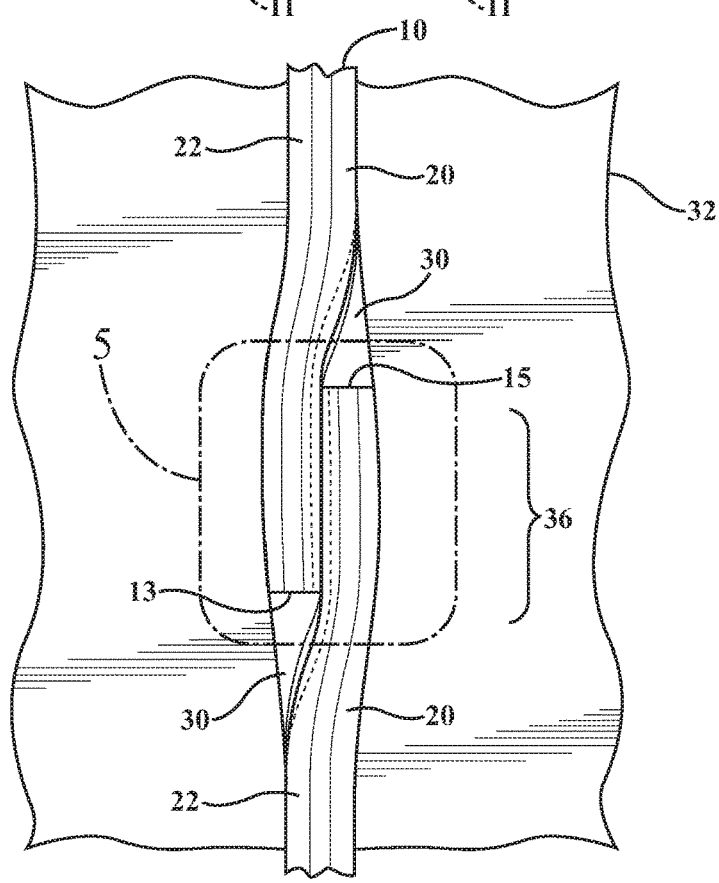
FIG. 4 is a top view of an extruded interlocking flexible gasket adjacent to itself interposed in a housing.
Figure 5:
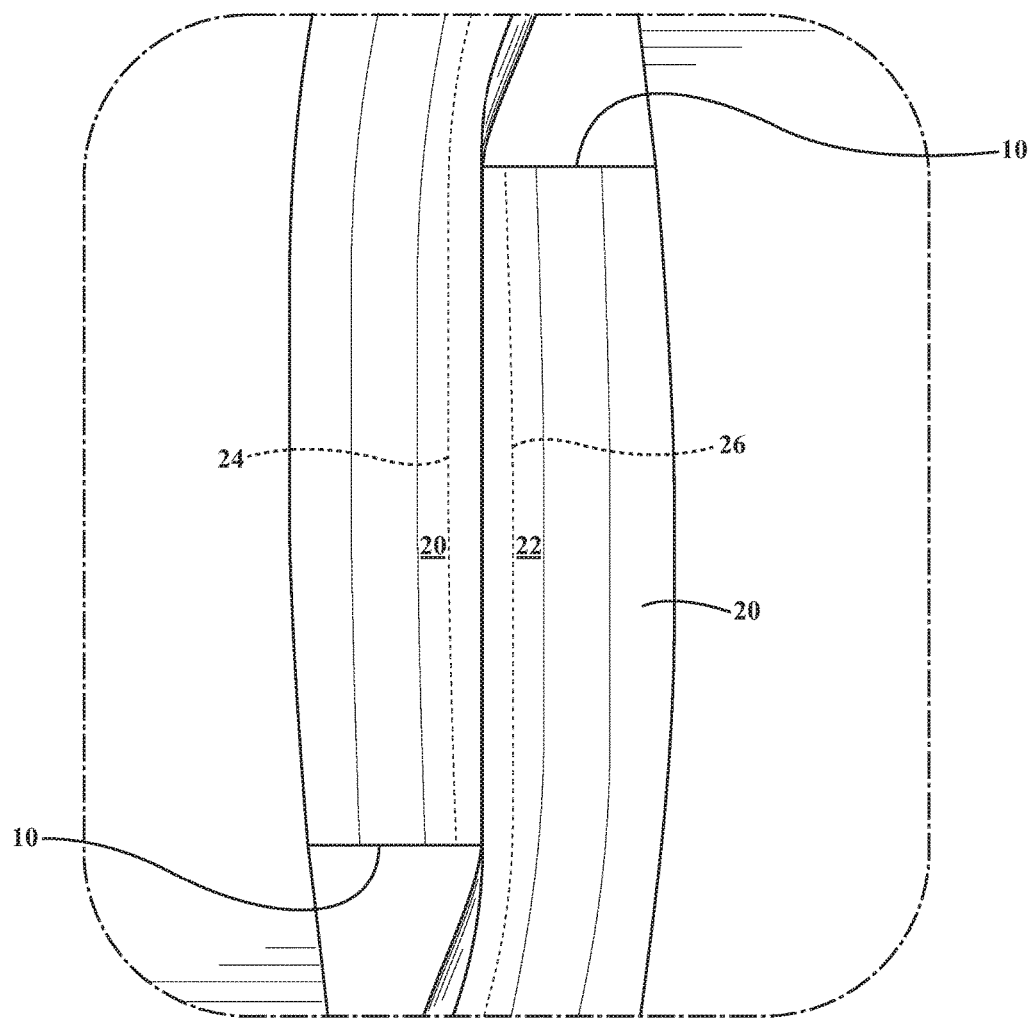
FIG. 5 is enlarged view of FIG. 4, further showing the details of the interlocking flexible gasket interposed in a housing.

Now with reference to FIGS. 4 and 5, the gasket 10 is in the channel 30 of the first member 32 and is shown overlapping itself with the gasket having a first end 13 and a second end 15. The shoulder 20 of the first side 10A engages with the arcuate shoulder 22, and the first spline edge 24 of the splen 12 and second spline edge 26 of the spline 16 are shown as hidden lines for orientation purposes.

To create the extruded gasket 10, an extrusion process can be utilized. A mixture of material is first loaded in an extrusion device (not shown). The mixture of material can include a polymer mixture, a filler, an activator, an accelerator, a bonding promoter, a curative compound, and a pigment. The polymer mixture forms the resilient compressible material of the gasket 10 and can be, for example, an inorganic polymer, an organic polymer, a copolymer, a fluoropolymer, a polyester, a rubber, a silicone rubber, a synthetic rubber and a vinyl polymer. The filler is added primarily to provide reinforcement and secondly to reduce cost. The activator can control the speed and sequencing of the polymerization process. The accelerator speed up the cure of the gasket. Modifications in their levels can control the cure speed and elastomer properties. The bonding promoters are often added to the compound to increase the bond strength between its different components. The curative compound can be added to form cross-links and will vary according to the type of elastomer being produced. The pigment is added to produce a desired color of the gasket.

The above ingredients are mixed to form an elastomer. The elastomer is then fed into an extruder, which pushes the elastomer through a die to form a gasket. The die is essentially shaped with the aforementioned splines, grooves, shoulders, and arcuate shoulder to produce the interlocking gasket 10.

The extruder can for example, be a screw extruder and a ram extruder, which can be optionally heated to aid with the extrusion process. The screw extruders have a screw housed within a barrel, with the screw turned by mechanical means. The elastomer is first fed into the barrel via a hopper and then forced down the barrel by the screw whilst heat is added (created by the shearing action and via the heated barrel and screw). At the end of the barrel, in the extruder head, the die through which the material is forced out. The ram extruder requires the elastomer to be rolled and warmed, usually by placing it in a bath of hot water or taking it directly from a mill. This roll is then placed into the cylinder housing of the ram. The head of the extruder containing the die is then locked in place at the front of the extruder and the ram traversed forward, forcing the gasket out of the die orifice.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An extruded interlocking flexible gasket comprising:
   a first side with a first side spline and a first side groove to be positioned between a first member and a second member; and
   a second side with a second side spline and a second side groove,
   wherein said gasket is formed from a resilient and compressible material,
   wherein an imaginary centerline extends between said first and second side grooves and said first and second side grooves do not cross said imaginary centerline,
   wherein said first side interlocks with said second side when said first side overlaps said second side.

2. The interlocking flexible gasket of claim 1, wherein said gasket is positioned in a groove in a first surface of said first member, wherein said gasket wraps around said groove in said first surface of said first member and said first side of said gasket overlaps said second side of the gasket to produce a seal between said first member and said second member.

3. The interlocking flexible gasket of claim 1, wherein said splines and said grooves further interlock as said first member is compressed upon said second member in order to seal said first member to said second member.

4. The interlocking flexible gasket of claim 1, wherein said first side groove has an opening, said opening having a width less than a maximum width of said second side spline in order to prevent disengagement of said second side spline from said first side groove along a longitudinal direction of said flexible gasket.

5. The interlocking flexible gasket of claim 1, wherein said gasket has an elliptical cross-sectional shape permitting a maximum first longitudinal movement when said gasket is compressed in a second longitudinal direction.

6. The interlocking flexible gasket of claim 1, wherein said resilient and compressible material is selected from the group consisting of an inorganic polymer, an organic polymer, a copolymer, a fluoropolymer, a polyester, a rubber, a silicone rubber, a synthetic rubber, and a vinyl polymer.

7. A method to seal the junction between two surfaces, comprising:
   loading at least one of a polymer mixture, a filler, an activator, an accelerator, a bonding promoter, a curative compound, and a pigment into a extruding device;
   mixing the at least one of said polymer mixture, said filler, said activator, said accelerator, said bonding promoter, said curative compound, and said pigment to form an elastomer;
   feeding the elastomer into an extruder;
   extruding said elastomer though a die to form a gasket; and
   positioning said gasket in a groove in a first surface, wherein said gasket wraps around said groove in said first surface and a first end of the gasket overlaps a second end of the gasket;
   placing a second surface on said gasket and said first surface, thereby sealing the first surface to the second surface.

8. The method of claim 7, wherein the polymer mixture is a least one of an inorganic polymer, an organic polymer, a copolymer, a fluoropolymer, a polyester, a rubber, a silicone rubber, a synthetic rubber, and a vinyl polymer.

9. The method of claim 7, further comprising, heating the extruder.

10. The method of claim 7, wherein the extruder is at least a screw extruder and a ram extruder.

11. The method of claim 7, further comprising, shaping the gasket with the die, wherein die produces said gasket with a first side with at a least one first side spline and at least one first side groove, and a second side with a second side spline and a second side groove.

12. The method of claim 7, further comprising, compressing said gasket as the first surface is positioned adjacent to the second surface, thereby further interlocking said first side spline and said first side groove as the first surface is attached to the second surface.

13. A system for sealing the junction between two surfaces, comprising:
   means for loading at least one of a polymer mixture, a filler, an activator, an accelerator, a bonding promoter, a curative compound, and a pigment into a extruding device;
   means for mixing the at least one of said polymer mixture, said filler, said activator, said accelerator, said bonding promoter, said curative compound, and said pigment to form an elastomer;
   means for feeding the elastomer into an extruder;
   means for extruding said elastomer though a die to form a gasket; and
   means for positioning said gasket in a groove in a first surface, wherein said gasket wraps around said groove in said first surface and a first end of the gasket overlaps a second end of the gasket;
   means for placing a second surface on said gasket and said first surface, thereby sealing the first surface to the second surface.

14. The system of claim 13, wherein the polymer mixture is a least one of an inorganic polymer, an organic polymer, a copolymer, a fluoropolymer, a polyester, a rubber, a silicone rubber, a synthetic rubber, and a vinyl polymer.

15. The system of claim 13, further comprising, means for heating the extruder.

16. The system of claim 13, wherein the extruder is at least a screw extruder and a ram extruder.

17. The system of claim 13, further comprising, means for shaping the gasket with the die, wherein die shapes said gasket with a first side with at a least one first side spline and at least one first side groove, and a second side with a second side spline and a second side groove.

18. The system of claim 13, further comprising, means for compressing said gasket as the first surface is positioned adjacent to the second surface, thereby further interlocking said first side spline and said first side groove as the first surface is attached to the second surface.

\* \* \* \* \*